United States Patent [19]  [11] 4,068,062
Lepert  [45] Jan. 10, 1978

[54] POLYMERIZING $C_5$ AND $C_6$ OLEFINS AND DIOLEFINS WITH 3° HYDROCARBYL HALIDE TO PRODUCE NARROW MOLECULAR WEIGHT PETROLEUM RESINS HAVING LOW SOFTENING POINTS

[75] Inventor: André Lepert, Rhode-Saint-Genese, Belgium

[73] Assignee: Exxon Research and Engineering Company, Linden, N.J.

[21] Appl. No.: 706,018

[22] Filed: July 16, 1976

[30] Foreign Application Priority Data

July 30, 1975 United Kingdom .............. 31878/75

[51] Int. Cl.² .................. C08F 2/00; C08F 10/00; C08F 12/00
[52] U.S. Cl. ........................... 526/76; 526/82; 526/89; 526/237; 526/238; 526/290; 528/501
[58] Field of Search .............. 526/82, 76, 290, 237, 526/238, 501, 89

[56] References Cited

U.S. PATENT DOCUMENTS

| | | | |
|---|---|---|---|
| 2,521,432 | 9/1950 | Walsh et al. | 526/82 |
| 2,734,046 | 2/1956 | Nelson et al. | 526/76 |
| 2,849,512 | 8/1958 | Banes et al. | 526/290 |
| 2,856,389 | 10/1958 | Fusco et al. | 526/290 |
| 2,894,937 | 7/1959 | Banes et al. | 526/76 |
| 2,964,504 | 12/1960 | Leary et al. | 526/290 |
| 2,994,689 | 8/1961 | Banes et al. | 526/76 |
| 3,709,854 | 1/1973 | Hepworth et al. | 526/290 |
| 3,817,953 | 6/1974 | Younger | 526/237 |
| 3,905,948 | 9/1975 | Vargiu et al. | 526/76 |
| 3,987,123 | 10/1976 | Lepert | 526/76 |

FOREIGN PATENT DOCUMENTS 98,052 5/1974 Japan.

Primary Examiner—Herbert J. Lilling
Attorney, Agent, or Firm—Rebecca Yablonsky

[57] ABSTRACT

A petroleum resin is prepared by a process which comprises polymerizing using a Friedel-Crafts catalyst:
a. a petroleum resin feed comprising $C_5$ and $C_5$ diolefins, $C_6$ olefins and $C_6$ diolefins or a mixture of $C_5$ and $C_6$ olefins and diolefins, said feed being obtained from the cracking of petroleum feedstock and
b. at least 0.5 wt.% based on the petroleum resin feed of a tertiary hydrocarbyl halide.

The resulting resin usually has a softening point of 20° to 125° C. These resins have an extremely narrow molecular weight distribution and hence have good wax compatibility, viscosity, flexibility and tackifying properties for rubber.

13 Claims, 1 Drawing Figure

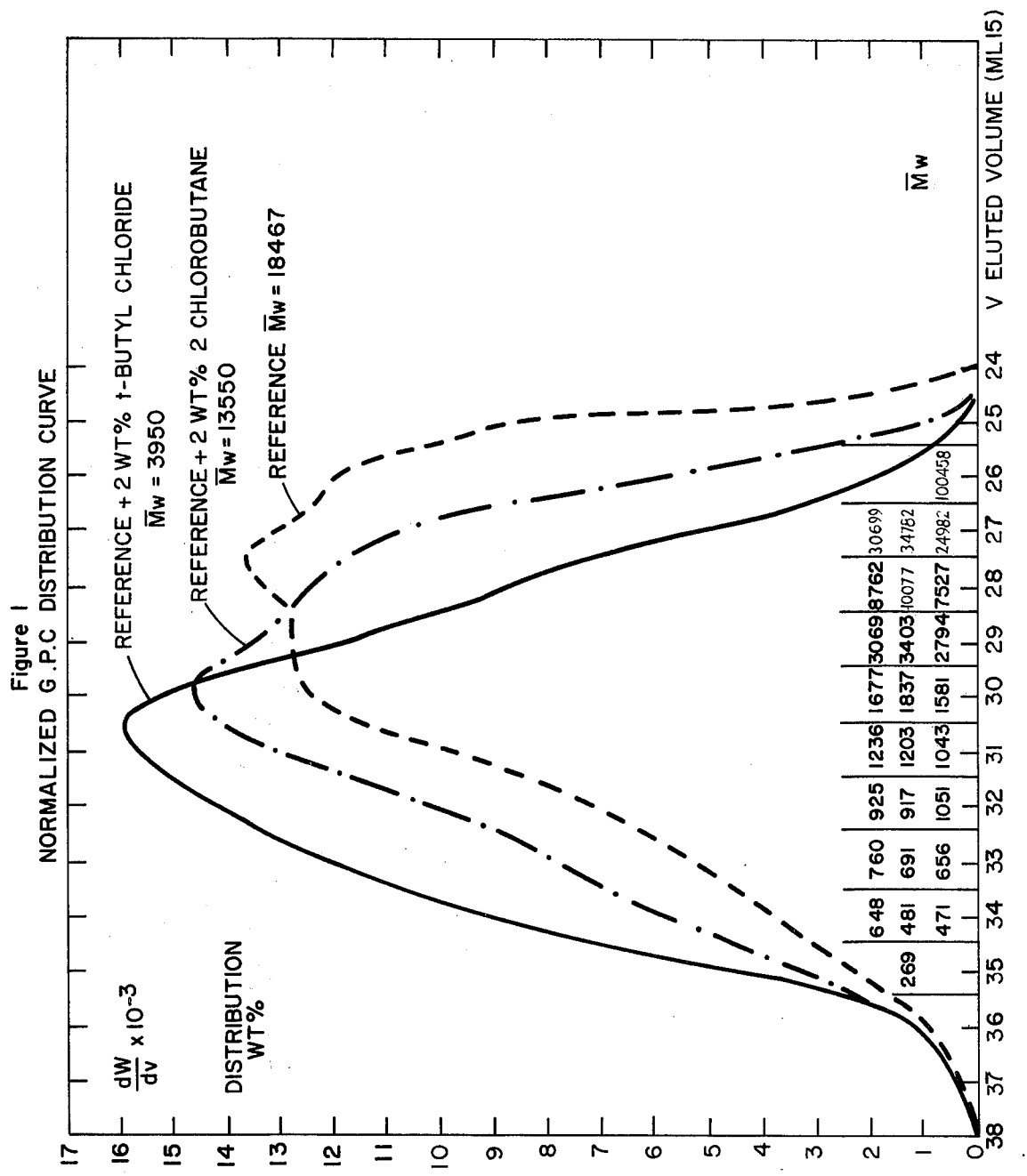

POLYMERIZING C₅ AND C₆ OLEFINS AND DIOLEFINS WITH 3° HYDROCARBYL HALIDE TO PRODUCE NARROW MOLECULAR WEIGHT PETROLEUM RESINS HAVING LOW SOFTENING POINTS

This invention relates to a process for producing petroleum resins.

According to this invention the quality and the production of petroleum resins as controlled by a process which comprises the polymerization using a Friedel Crafts catalyst of:

a. a petroleum resin feed comprising $C_5$ olefins and diolefins, $C_6$ olefins and diolefins or a mixture of $C_5$ and $C_6$ olefins and diolefins, said feed being obtained from the cracking of petroleum feedstock and b. at least 0.5 wt.% based on the petroleum resin feed of a tertiary hydrocarbyl halide. This component i.e. the tertiary hydrocarbyl haide is a promoter which enables the control of the polymerization efficiency and reduces the resin molecular weight distribution according to quality requirements. With accurate addition of this promoter it is possible to produce a low softening point petroleum resin particularly attractive as rubber tackifier while increasing the resin yield.

Although water and hydrogen chloride, which are generally present in the petroleum resin feed (50–500 ppm water and HCl due to partial hydrolysis of the catalyst), are known to enhance the activity of Friedel-Crafts catalyst we have found that the acitivity of the catalyst is much more enhanced by the use of the tertiary hydrocarbyl halide as specified by the process of our invention.

The $C_5$ or $C_6$ diolefins- and olefins- containing feed is obtained from the cracking of petroleum feedstock. Such feedstocks include naphthas, kerosene, gas oil and vacuum gas oil. The feedstocks usually have a boiling point range from 20° to 450° C.

The petroluem feedstock is cracked preferably in the presence of steam and the recommended cracking temperature is between 500° and 870° C. The product which contains unsaturated hydrocarbons usually boiling in the range of 20° to 240° C, e.g. 20° to 230° is then preferably subjected to fractionation to remove $C_2$ and $C_4$ light ends, and thermal soaking and distillation to remove cyclic conjugated diolefins which are gel precursors (cyclopentadiene and methylcyclopentadiene being removed as dimers).

If thermal soaking is carried out it is preferred that the temperature be between 100° and 150° C, especially 120° to 140° e.g. about 130° C. This soaking usually takes 0.5 to 6 hours, e.g. 0.5 to 1 hour.

After termal soaking and distillation one obtains an overhead naphtha wich usually boils from 25° to 110° C, e.g. 20° to 80° C, the best results being achieved with a 25°–70° C cut. This overhead naphtha comprises mainly $C_5$ diolefins such as isoprene and 1,3 cis- and trans-pentadienes, $C_5$ to $C_6$ mono-olefins and aromatics for instance benzene.

In general, the overhead naphthas have the following composition which obviously depends on the nature of the petroleum feedstock which is subjected to steam cracking.

|  | % by weight |
|---|---|
| Total paraffins | 1.0 to 41.5 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadienes 1,3 | 14.5 to 4.5 |
| Cyclopentadiene | 1.0 to 2.5 |

The feed could be significantly isoprene-free provided this compound is previously recovered through any conventional extraction process such as extractive distillation or azeotropic distillation. Moreover, depending on the final boiling point of the feed cut the feedstock could be substantially free of benzene. Cyclopentene contents are generally below 3.0 wt.%.

The cyclodiene dimers produced during the 100°–160° C, thermal soaking step are generally not included in the feed tobe polymerized, because they are detrimental to the specific properties of the resins. However, if required (such as production of higher resin softening points) they could be left in the resin feed, the distillation step previously mentioned being therefore carried out before the heat soaking step.

The second component of the mixture which is used as feed additive and plays the role of resin molecular weight regulator is a tertiary hydrocarbyl halide, for example a tertiary alkyl halide, tertiary alkaryl halide, or a tertiary aryl halide. Tertiary alkyl halides such as chlorides, bromides or iodides are preferred.

The hydrocarbyl chain can vary from 1 to 30 carbon atoms, preferably 1 to 6 carbon atoms. The chain can be aliphatic, cyclic, linear or branched, unsaturated or preferably saturated. Relatively short chained compounds such as tertiary-butyl chloride or tertiary-butyl bromide are particularly reactive and are therefore recommended. Other typical examples are t-pentyl chloride, t-methyl pentyl chloride, triethyl methyl chloride, triphenyl methyl chloride, cumyl chloride and t-alkyl halides derived from norbornene rings, such as norbornyl chloride or norbornyl bromide. The choice of the compounds can be made according to their boiling points which should preferably be less than 300° C, and should be consistent with the polymerization conditions such as temperature and pressure in order to maintain them in liquid phase. Thus if low boiling point compounds be used the polymerization temperature and pressure should be carefully chosen to maintain them in the liquid phase.

The concentration of tertiary hydrocarbyl halide can vary from 0.5 to 10 wt.% preferably 0.5 to 5 wt.%, based on the eight of petroleum resin feed. In the range 0.5 to 1.0 wt.% these halides usually act as promoter but at higher concentrations they usally act as transfer agents.

The polymerization reaction may take place in the presence of a solvent. Such solvents include aromatic solvent, e.g. benzene; olefinic rich streams the olefins containing either terminal or internal double bonds and being linear or branched, e.g. 2-hexene; paraffins e.g. n-heptane or isopentane; or organic halides, e.g. methylene dichloride.

The petroleum resin feed and component (b) are mixed according to the ratios outlined above and then polymerized using a Friedel Craft catalyst, for example, aluminium chloride, aluminium bromide, or a liquid aluminium chloride/hydrochloric acid/substituted aromatic complex, the aromatic being, for example, o- xylene, mesitylene, ethyl benzene, isopropyl benzene and for example other short or long chain alkyl benzenes. The alkyl chain can be linear or branched and can vary from 1 to 30 carbon atoms.

Acidic liquid $AlCl_3$ sludges obtained as by-products during the alkylation of benzene or any other subtituted aromatics (toluene, xylene) with branched chain olefins can be directly used as catalyst for the above described polymerization process. The branched chain olefins which are, for example, produced via the boron trifluoride oligomerization of propylene and fractionation: e.g. $C_{12}$ olefins or $C_{24}$ olefins can then be alkylated with aromatics producing in situ sludge. As example the acidic sludge available from a dodecylbenzene plant provided similar results as the preformed o-xylene $AlCl_3$/HCl liquid complex.

These liquid complexes are slightly more efficient than $AlCl_3$ powder at equivalent concentration and provide slightly higher resin yields and lower resin molecular weight. Therefore the amount of feed additive required for narrowing the resin molecular weight is significantly reduced. Moreover when by-product sludges are available in plant site, the catalyst cost is reduced and such a process is particularly attractive.

In the polymerization process the amount of catalyst may vary from 0.25 to 3.0 wt.% preferably 0.5 to 1.5 wt.% based on the weight of the mixture to be polymerized. The optimum concentration depends on the nature of the solvent which affects the solubility of the catalyst as well as on the stirring efficiency inside the polymerization reactor. High catalyst concentration reduces the resin molecular weight distribution and therefore limits the amount of feed additive required for controlling the resin molecular weight.

Other Friedel Crafts catalysts like titanium tri or tetrachloride, tin tetrachloride, boron tri-fluoride, boron tri-fluoride complexes with organic ethers, phenols or acids could be used too but they lead to rather low resin yields and large quantities of liquid oligomers of low value are obtained. Even though these oily oligomers could be upgraded as reactive plasticizer or liquid plasticizer such catalysts are not recommended. Other possible catalysts are acidic clays.

Usual polymerization temperatures are between $-20°$ and $100°$ C, preferably $30°$ and $80°$ C.

After polymerization the residual catalysts may be removed by, for example, washing with aqueous solution of alkali, ammonia or sodium carbonate, or by the addition of a alcohol such as a methanol and subsequent filtration.

The final resin may be stripped of unreacted hydrocarbons ("raffinate" rich in benzene and/or paraffins/unreactive olefins) and low molecular weight oily oligomers by steam stripping or vacuum distillation. The finished product is a substantially non-aromatic unsaturated thermoplastic hydrocarbon resin. It usually has a softening point from $20°$ to $125°$ C, preferably $60°$ to $110°$ C.

For the production of very low softening point resins or liquid resins the t-hydrocarbyl halide can be combined with a branched chain olefin provided the above mentioned steam stripping step after polymerization is replaced by a flash distillation (e.g. solvent and unreacted components removal), e.g. at about $200°$ C.

Examples of suitable branched chain olefins are isobutene, methyl butenes-1 and -2 rich streams, U.O.P. olefin of diisobutene. The branching can be either on the double bond or in the $\alpha$-position and the aliphatic chain can be either mono or polysubstituted. The olefins are preferably mono aliphatic olefins.

With U.O.P. olefins the chain length can vary from 4 to 30 carbon atoms, but preferably from 5 to 9 carbon atoms per molecule. U.O.P. olefins are maufactured by oligomerisation of propylene with an acidic catalyst like phosphoric acid and recovered by fractionation. Usually the shorter chain olefins are the more reactive.

Other branched chain aliphatic olefins of similar structure can be produced from fluid catalytic cracked naphtha.

Diisobutene can be a pure component or preferably a steam cracked petroleum derivative obtained by isobutene extraction with sulphuric acid and recovered as the dimer by thermal decomposition of the corresponding organic sulphate. The diisobutene concentrate contains the isobutene dimers such as 2,2,4 trimethyl-2-pentene and 2,2,4 trimethyl-1-pentene but also a significant amount of isobutene trimers.

It can be purified by distillation if required.

If desired the tertiary hydrocarbyl halide additive may be combined with an unsaturated aromatic hydrocarbon, e.g. styrene, $\alpha$-methyl styrene, vinyl toluene or indene. The resulting resin is particularly suitable as a tackifier for SBR and SIR rubbers.

It has been found that the process herein described results in an increase of the resin production due to enhanced polymerization efficiency but also enables one to control the resin molecular weight distribution. The resins of this invention are characterized by a rather high halide content and by an extremely narrow molecular weight. Moreover it is known that reducing the resin molecular weight or narrowing the resin molecular weight distribution is consistent with an improvement of the overall resin properties such as wax compatibility, viscosity, flexibility, tackifying properties for natural and synthetic rubbers. Also the introduction of a potentially reactive halogen atom into the resin structure provides a reactivity leading to a possible further chemical modification.

Additionally, this technique allows the production of low softening point resins of excellent flexibility, elongation, compatibility and having outstanding tackifying properties for thermoplastic block styrene-isoprene rubbers (CARIFLEX TR 1107).

Typical applications resulting from such resin quality improvement could cover the manufacture of pressure sensitive adhesives, hot melt adhesives, latex adhesives, masking tapes, caulks, sealants, mastics, carpet backing, book binding, road marking, hot melts, paper sizing and coatings. Low softening point resins ($70°-100°$ C softening point range) produced, according to the present process can be used as tackifiers or curing agents for natural and synthetic rubbers such as polyisoprene, neoprene, butyl, EPDM, chlorobutyl or bromobutyl. This technique ca also be used for eliminating the oil included in inner-tubes formulation which generally, drastically reduces the impermeability of the rubber. Usually the amount of the resin produced by the process of this invention which is mixed with the rubber in such applications is 65-250 p.h.r., e.g. 100-175 p.h.r. The polarity of these resins also improves their adhesion to polar substrates, for example metal and glass.

Moreover, if required, these resins can be processed as an intermediary reactive molecule (reaction on the halogen atom, e.g. reaction with phenol, amines, hydroxylation, or grafting) or modified through conventional petroleum resin modifications with unsaturation anhydrides (e.g. maleic anhydride) or unsaturated acid (e.g. fumaric acid) dicarboxylic acids, or isocyanates and transformed into polar resins.

EXAMPLE 1

The efficiency of t-butyl chloride additive was tested in presence of AlCl$_3$ powder and AlCl$_3$/HCl/o-xylene complex as catalyst. This complex was prepared by bubbling gaseous dry hydrochloric acid through a very ell stirred AlCl$_3$/o-xylene mixture (1 mole of each). AlCl$_3$ was progressively dissolved while HCl was absorbed in the reaction mixture until 0.5 mole was reacted.

The composition of this liquid complex was as follows:

| AlCl$_3$ | Wt.% | 51.8 |
|---|---|---|
| O-xylene | Wt.% | 41.2 |
| HCl | Wt.% | 7.0 |

The catalyst concentration measured as AlCl$_3$ was 0.75 wt.% based on the feed including the t-butyl chloride additive. The polymerization reaction was carried out at 43° C for 60 minutes.

The petroleum resin feed as a steam cracked feedstock of 28°–80° C boiling range. Its composition was the following:

| Paraffins | Wt.% | 21.30 |
|---|---|---|
| C$_5$ and C$_6$ diolefins | Wt.% | 27.00 |
| C$_5$ and C$_6$ olefins | Wt.% | 25.55 |
| Benzene | Wt.% | 26.15 |
| Typical C$_5$ diolefins | | |
| Isoprene | wt.% | 11.85 |
| Pentadiene 1,3 trans | Wt.% | 5.95 |
| Pentadiene 1,3 cis | Wt.% | 4.30 |
| Cyclopentadiene | Wt.% | 1.40 |
| Typical C$_5$ olefins | | |
| 2 Methyl butene 1 | Wt.% | 5.05 |
| 2 Methyl butene 2 | Wt.% | 2.95 |
| Pentene 1 | Wt.% | 4.75 |
| Cyclopentene | Wt.% | 1.50 |

The properties of the corresponding resins are shown in the following table:

| Resin Sample: | 1 | 2 | 3 |
|---|---|---|---|
| Feed wt.% | 100 | 100 | 100 |
| t-butyl chloride wt.% | 0 | 1 | 1 |
| Catalyst nature | AlCl$_3$ | AlCl$_3$ | AlCl$_3$/o-xylene/HCl complex |
| Resin yield wt.% | 24.2 | 28.4 | 29.7 |
| Oligomers yield wt.% | 1.4 | 2.8 | 4.2 |
| Resin Gardner Colour (50 wt.% in toluene) | 4.5 | 5+ | 6− |
| Resin Softening point ° C | 99 | 100 | 102 |
| Resin chlorine content ppm | 750 | 7460 | 8025 |
| Resin molecular weight Mn | 2190 | 1620 | 1660 |
| Wax cloud point ° C | 250 | 110 | 100 |
| Wax*/EVA 250**/resin 70/15/15 wt.% | | | |
| Resin yield increase wt.% | 0 | 15.7 | 22.7 |

*Wax softening point ° C.: 65
**EVA 250 = Dupont ethylene vinyl acetate copolymer The addition of t-butyl chloride enhances considerably the catalyst efficiency and therefore increases considerably the resin yield. On the other hand its transfer ability is well demonstrated by the significant reduction of the resin molecular weight followed by a high chlorine build-up.

EXAMPLE 2

A similar run to that of Example 1 was carried out with another 28°–80° C steam cracked petroleum feedstock. The catalyst was AlCl$_3$ powder 0.75 wt.% based on total feed and polymerization conditions were 52° C and 90 minutes. The feed exhibited the following composition:

| Paraffins | Wt.% | 6.00 |
|---|---|---|
| C$_5$ and C$_6$ diolefins | Wt.% | 32.60 |
| C$_5$ and C$_6$ olefins | Wt.% | 32.70 |
| Benzene | Wt.% | 28.70 |
| Typical C$_5$ diolefins | | |
| Isoprene | Wt.% | 14.30 |
| Pentadiene 1,3 trans | Wt.% | 7.67 |
| Pentadiene 1,3 cis | Wt.% | 4.50 |
| Cyclopentadiene | Wt.% | 1.40 |
| Typical C$_5$ olefins | | |
| 2 Methyl butene 1 | Wt.% | 1.62 |
| 2 Methyl butene 2 | Wt.% | 3.00 |
| Pentene 1 | Wt.% | 6.60 |
| Cyclopentene | Wt.% | 2.70 |

Conclusions drawn from this Example were similar to those described in Example 1 and t-butyl chloride was extremely active at low concentration (0.5 wt.%).

| Resin Sample: | 4 | 5 | 6 |
|---|---|---|---|
| Feed wt.% | 100 | 100 | 100 |
| t-butyl chloride wt.% | 0 | 0.5 | 1 |
| Resin yield wt.% | 36.9 | 41.5 | 43.8 |
| Oligomers yield wt.% | 2.6 | 2.5 | 3.1 |
| Resin Gardner Colour (50 wt.% in toluene) | 5.5 | 5+ | 6− |
| Resin softening point ° C | 99.5 | 98 | 102 |
| Resin chlorine content ppm | 1115 | 3150 | 4845 |
| Resin molecular weight (Mn) | 2520 | 1800 | 1685 |
| Wax could point ° C | >250 | 150 | 75 |
| Wax/EVA 250/resin 70/15/15 wt.% | | | |
| Resin yield increase wt.% | 0 | 12.5 | 18.7 |

EXAMPLE 3

In this Example the petroleum resin feed was a lighter cut (28°–70° C) combined with pure benzene grade as solvent (feed/benzene ratio: 70/30 wt.%).

The 28°–70° C feed had the following composition:

| | Solvent excluded | Solvent included |
|---|---|---|
| Paraffins wt.% | 2.30 | 1.60 |
| C$_5$ and C$_6$ diolefins wt.% | 43.00 | 30.10 |
| C$_5$ and C$_6$ olefins wt.% | 47.00 | 32.90 |
| Benzene | 7.70 | 35.40 |
| Typical C$_5$ and C$_6$ diolefins (wt.%) | | |
| Isoprene | 19.50 | 13.65 |
| Pentadiene 1,3 trans | 10.90 | 7.65 |
| Pentadiene 1,3 cis | 6.30 | 4.40 |
| Cyclopentadiene | 2.10 | 1.50 |
| Typical C$_5$ and C$_6$ olefins (wt.%) | | |
| 2 Methyl butene 1 | 7.95 | 5.60 |
| 2 Methyl butene 2 | 8.50 | 5.95 |
| Pentene 1 | 7.85 | 5.50 |
| Cyclopentene | 3.65 | 2.55 |

In this example the respective efficiency of primary, secondary and t-butyl chlorides was evaluated within the 0–4 wt.% range. The catalyst was AlCl$_3$ powder (0.75 wt.% on total feed including the additives) and the polymerization runs were carried out at 55° C for 90 minutes.

Table 1 gives typical resins properties obtained with such organic halides.

BRIEF DESCRIPTION OF THE DRAWING

Again the activity of t-butyl chloride is well demonstrated and provided that enough concentration is used (4 wt.% on feed) a low softening point resin (S.P. = 73° C) of extremely narrow molecular weight distribution (FIG. 1) can be produced.

Butyl halides exhibit a transfer ability in the following decreasing order:

t-butyl > secondary > primary.

hours. Load: 1 kg-Contact area 12.5 × 25 mm-adhesive tape: width 12.5 mm.

The adhesive formulations were based on natural rubber (65 Mooney viscosity) and the resin content was 100 phr (100 resin parts for one hundred parts of rubber). As shown in Table 2, the resins produced with the t-butyl chloride addition technique were characterized by a narrow molecular weight distribution and therefore were better tackifiers for elastomers. Moreover the PSA films have excellent ageing properties and do not lose their tackiness.

TABLE 1
EFFECT OF ORGANIC HALIDES AS TRANSFER AGENTS

| Resin Sample | | 7 | 8 | 9 | 10 | 11 | 12 | 13 |
|---|---|---|---|---|---|---|---|---|
| Feed | wt.% | 100 | 100 | 100 | 100 | 100 | 100 | 100 |
| Additive nature | | ← | | t-butyl chloride | | → | 2 chloro butane | 1 chloro butane |
| Additive content | wt.% | 0 | 0.5 | 1 | 2 | 4 | 2 | 2 |
| Resin yield | wt.% | 38.5 | 39.3 | 40.5 | 39.6 | 39.0 | 39.7 | 39.3 |
| oligomers yield | wt.% | 3.2 | 2.1 | 3.2 | 6.3 | 10.4 | 5.5 | 2.1 |
| Resin Gardner colour (50 wt.% in toluene) | | 3+ | 4+ | 4+ | 4.5 | 5+ | 5− | 3+ |
| Gardner colour after heating - 16 hrs at 150° C | | 13− | 13+ | 13+ | 12+ | 15− | 12− | 13+ |
| 3 hrs at 200° C | | | 14− | 14− | 14− | | 14+ | 14− |
| Resin softening point ° C | | 97.5 | 97 | 92 | 86 | 73 | 92 | 99.5 |
| Resin chlorine content (ppm) | | 1600 | 2680 | 5465 | 10100 | 13500 | 5220 | 1812 |
| Resin molecular weight Mn | | 2020 | 1475 | 1295 | 1185 | | 1465 | 1530 |
| Wax cloud point ° C Wax/EVA 250/resin | | | | | | | | |
| 70/15/15 wt.% | | 135 | | | | | | |
| 60/20/20 wt.% | | | | | | | 80 | 120 |
| 50/25/25 wt.% | | >250 | 125 | 95 | 72 | <65 | 140 | 190 |
| Resin viscosity (60 wt.% in toluene) Centipoises at 25° C | | 135 | 65 | 54 | 34 | | 67 | 93 |
| Resin yield increase wt.% | | 0 | 2.1 | 5.2 | 2.9 | 1.3 | 3.2 | 2.1 |

TABLE 2
PRESSURE SENSITIVE ADHESIVE PROPERTIES

| Resin Sample | 4 | 5 | 6 | 7 | 8 | 9 | 10 | 11 | 12 | 13 |
|---|---|---|---|---|---|---|---|---|---|---|
| | ← | (Example 2) | → | ← | | (Example 3) | | | | → |
| Resin phr | 100 | 100 | 100 | 100 | 100 | 100 | 100 | 100 | 100 | 100 |
| 180° Peel strength (grams/25 mm) | 317 | 838 | 905 | 590 | 950 | 1070 | 928 | 838 | 906 | 938 |
| Polyken Tack (grams) | 0 | 200 | 500 | 100 | 700 | 750 | 750 | 850 | 700 | 650 |
| Tack Rolling Ball Method (cm) | >30 | >30 | 20 | >30 | 10 | 8 | 6 | 2 | 7 | 10 |
| Shear Adhesion on Paper (hr to failure) | 1 | 4 | 3.5 | 5 | 3 | 2.5 | 2.5 | 1 | 3 | 2.5 |

EXAMPLE 4

Pressure Sensitive Adhesives

To assess pressure sensitive adhesion properties a sample of natural rubber of adequate Mooney viscosity was solubilized in a n-heptane-toluene solution with a petroleum resin produced according to the present invention and an antioxidant. The pressure sensitive adhesive film used for tack measurement was prepared by evaporating overnight at room temperature, a thin layer or rubber/resin solution spread on a cellophane or a polyester film. The adhesive mass was 30 g/m².

The pressure sensitive adhesive properties are those developed by the technical committee of the pressure sensitive adhesive tape council (PSTC) and more especially:

180 Peel strength (PSTC-1 method)
Tack Rolling Ball method (PSTC-6)
Polyken Tack
Shear adhesion (PSTC-7) modified in order to have accelerated results.

The adhesive tape is applied upon Kraft paper instead of stainless steel panels. Failure is also recorded in

EXAMPLE 5

In this example the pressure sensitive adhesive formulation was based on a random styrene butadiene elastomer (SMR 1011), the tackifying resin being the low softening point one described in Example 3 (resin sample no: 11). Even though rather poor tackifying properties were found with pure SBR 1011, good values were obtained with the introduction of natural rubber into the pressure sensitive adhesive formulation.

| Resin sample: | 11 | 11 | Pentalyn H | Escorez 5300 (petroleum resin) |
|---|---|---|---|---|
| SBR 1011 (parts) | 100 | 100 | 100 | 100 |
| Natural Rubber (parts) | | 10 | 10 | 10 |
| Resin (parts) | 65 | 9 | 9 | 9 |
| 180° Peel Strength (grams/ 25mm) | 725 | 1225 | 1721 | 1495 |
| Polyken Tack (grams) | 0 | 900 | 1300 | 500 |
| Tack Rolling Ball Method (cm) | >30 | 5 | 5 | >15 |

EXAMPLE 6

Similar pressure sensitive adhesive formulations were prepared with a synthetic thermoplastic block styrene-isoprene rubber (CARIFLEX or in the U.S.A., KRA-TON TR 1107) supplied by Shell. The styrene content measured by N.M.R. was 29 wt.%. Resin contents varied from 65 to 235 phr.

As previously described with the other cases outstanding tackiness is achieved even at high resin concentration (235 phr) (Table 3). Therefore low cost pressure sensitive adhesives can be made from these resins, which combine additionally a good adhesion on metal. These are found to be cheaper than pressure sensitive formulations previously made by blending CARIFLEX with resins, polyterpenes or resin derivatives.

TABLE 3

| | Pressure Sensitive Adhesives Based on Block Styrene-Isoprene Rubber | | | |
|---|---|---|---|---|
| Resin Sample | 11 | 11 | 11 | 11 |
| | ← | (Example 3) | → | |
| TR 1107 rubber parts | 60 | 50 | 40 | 30 |
| Resin parts | 40 | 50 | 60 | 70 |
| Resin phr | 67 | 100 | 150 | 233 |
| 180° Peel Strength (grams/25 mm) | 1540 | 1812 | 2425 | 2740 |
| Polyken Tack (grams) | 950 | 1100 | 1450 | 1600 |
| Tack Rolling Ball Method (cm) | 2.5 | 2.5 | 2.5 | 3.5 |
| Shear Adhesion on Paper (hr to failure) | — | 240 | 240 | — |

EXAMPLE 7

In this example the low resin softening point produced from 4 wt.% t-butyl chloride (resin sample no. 11) was modified by alkylation with phenol in presence of 0.75 wt.% $AlCl_3$ as catalyst).

The alkylation step was carried out in white spirit as solvent within the 50°-150° C temperature range. The resin was recovered after neutralization of the catalyst and steam stripping.

The corresponding resins showed improved tackifying properties for both natural rubber and styrene-isoprene block copolymers (Table 4).

TABLE 4

| | Pressure Sensitive Adhesives based on Phenol Alkylated Resin | | | | |
|---|---|---|---|---|---|
| Resin Sample | 11 | 11 | 14(*) | 15() | 15() |
| Rubber nature | Natural | TR 1107 | Natural | Natural | TR 1107 |
| Rubber parts | 50 | 40 | 50 | 50 | 40 |
| Resin parts | 50 | 60 | 50 | 50 | 60 |
| Resin phr | 100 | 150 | 100 | 100 | 150 |
| Resin softening point ° C | 73 | 73 | 75 | 95 | 95 |
| 180° Peel strength (grams/25 mm) | 838 | 2425 | 925 | 1200 | 3035 |
| Polyken Tack (grams) | 850 | 1450 | 850 | 1000 | 1200 |
| Tack Rolling Ball Method (cm) | 2 | 2.5 | 1.5 | 11 | >30 |
| Shear Adhesion on paper (hr to failure) | 1 | | 10 | 1.5 | |

(*)Phenol alkylated resin at 70° C - 5 wt.% Phenol added on resin - Resin softening point 75° C.
(**)Phenol alkylated resin at 110° C - 3 wt.% Phenol added on resin - Resin softening point 95° C after alkylation - Resin Phenol content 1.5 wt.%.

EXAMPLE 8

The low softening point resin produced from 4 wt.% t-butyl chloride (resin sample no. 11) was modified by treatment with an aqueous solution of sodium bicarbonate during 20 hours at 30° C in presence of tetrahydrofuran as solvent. After water washing the resin was recovered by extraction with diethyl ether. After drying the resin was concentrated under vacuum. The resin softening point was lowered to 64°-65° C.

Obviously the presence of hydroxyl group modified the pressure sensitive properties of the resin in natural and synthetic SBR-isoprene rubbers (Table 5).

TABLE 5

| | Pressure Sensitive Adhesives based on Hydroxylated Resin | | | |
|---|---|---|---|---|
| Resin Sample no. 11 | Unmodified | | Hydroxylated | |
| Rubber Nature | Natural | TR 1107 | Natural | TR 1107 |
| Rubber parts | 50 | 40 | 50 | 40 |
| Resin parts | 50 | 60 | 50 | 60 |
| Resin phr | 100 | 150 | 100 | 150 |
| Resin softening point ° C | 73 | 73 | 65 | 65 |
| 180° Peel strength (grams/25 mm) | 838 | 2425 | 498 | 2085 |
| Polyken Tack (grams) | 850 | 1450 | 650 | 900 |
| Tack Rolling Ball Method (cm) | 2 | 2.5 | 4.5 | 7 |
| Shear Adhesion on Paper (hr to failure) | 1 | 240 | — | — |

EXAMPLE 9

Other Chemical Modifications

The halide containing resins can be modified as conventionally done with phenols (see above), unsaturated anhydrides (e.g. maleic anhydride), unsaturated acids (e.g. fumaric acid) or by chemical attack of the halogen atom through elimination reaction.

For example they can be used as curing agents in rubber formulations, or modified by grafting.

An example of vulcanization reaction has been shown as follows from the low softening point resin prepared from 4 wt.% t-butyl chloride, by reaction at 150° C for 16 hours with curing agents:

| Resin | 100 | 100 | 100 | 100 |
|---|---|---|---|---|
| ZnO | 0 | 5 | 0 | 5 |
| S | 0 | 4 | 9 | 4 |
| MBT | 0 | 1 | 1 | 0 |
| Vulcan | 0 | 0 | 0 | 2 |
| Resin Softening Point ° C | 73 | 98.5 | 99.5 | 93 |

Indeed, the resin reactivity is strongly dependent on the nature of the halide atom attached on the resin skeleton. So t-alkyl bromide is preferred to t-alkyl chloride for such further chemical modification.

Indeed, the added reactivity process obtained in the invention is not limited to low softening point petroleum resins but can be applied to any cationic polymerization process.

such a resin can be used in the manufacture of pressure sensitive adhesive formulations.

| Resin Sample: | | 16 | 17 |
|---|---|---|---|
| Feed | wt.% | 70 | 70 |
| Solvent (benzene) | wt.% | 30 | 30 |
| t-butyl bromide | wt.% | 0 | 4 |
| Resin yield | wt.% | 33.0 | 34.7 |
| Oligomer yield | wt.% | 3.2 | 3.4 |
| Resin Gardner colour (50 wt.% in toluene) | | 3+ | 4+ |
| Resin softening point | | 100 | 76 |
| Resin chlorine content (ppm) | | 410 | 2030 |
| Resin bromine content (ppm) | | nil | 24300 |
| Resin molecular weight (Mn) | | 1795 | |
| Resin yield increase (wt.%) | | | 5.1 |
| Pressure Sensitive Adhesive | | | |
| Natural rubber (parts) | | 50 | 50 |
| Resin (parts) | | 50 | 50 |
| resin phr | | 100 | 100 |
| 180° peel strength (lb/inch) | | 1.60 | 1.90 |
| Polyken tack (grams) | | 0 | 90 |
| Rolling Ball Tack (cm) | | >30 | 2 |
| shear on paper substrate (hr to failure) | | 4 | 0.5 |

(NB All parts are parts by weight)

EXAMPLE 11

Combination of t-butyl Halides with branched Olefins

The feed composition and the polymerization conditions are those described in Example 10 (resins 16 and 17).

| Resin Sample | | 16 | 17 | 18 | 19 | 20 |
|---|---|---|---|---|---|---|
| Feed | wt.% | 70 | 70 | 70 | 80 | 80 |
| Solvent (benzene) | wt.% | 30 | 30 | 30 | 0 | 0 |
| Branched olfins | wt.% | 0 | 0 | 0 | $C_5$–$C_8$ U.O.P. olefin | |
| | | | | | ← 20 → | |
| t-butyl bromide | wt.% | 0 | 4 | 4 | 4 | 8 |
| Finishing Operations: | | ← steam stripping → at 250° C | | | ← Flash at 200° C → | |
| Resin yield | wt.% | 33.0 | 34.7 | 37.5 | 44.0 | 43.3 |
| Oligomers yield | wt.% | 3.2 | 3.4 | | | |
| Resin softening point | ° C | | 76 | 30 | liq. | liq. |
| Resin chlorine content | ppm | | 2030 | | 4900 | 6000 |
| Resin bromide content | ppm | | 24300 | | 34700 | 57900 |

EXAMPLE 10

Effect of t-Butyl Bromide

In this example the resin feed was a light cut (28°–70° C) combined with para benzene grade as solvent (feed/benzene ratio: 70/30 wt.%).

| | Solvent Excluded |
|---|---|
| Paraffins wt.% | 21.43 |
| $C_5$ and $C_6$ diolefins wt.% | 39.05 |
| $C_5$ and $C_6$ olefins wt.% | 37.40 |
| Benzene wt.% | 2.12 |
| Typical $C_5$ and $C_6$ Diolefins (wt.%) | |
| Isoprene | 18.59 |
| Pentadiene 1,3 trans | 7.85 |
| Pentadiene 1,3 cis | 5.73 |
| Cyclopentadiene | 3.60 |
| Typical $C_5$ and $C_6$ Olefins (wt.%) | |
| 2 methyl butene 1 | 7.63 |
| 2 methyl butene 2 | 3.60 |
| Pentene 1 | 8.72 |
| Cyclopentene | 3.35 |

In this example the catalyst was $AlCl_3$ powder (0.75 wt.% on total feed including additives) and the polymerization was carried out at 50° C for 75 minutes.

It appears similar conclusions can be achieved with either t-butyl chloride or t-butyl bromide at the same concentration: 4 wt.% (see resin 11 in table 1). Again

What is claimed is:

1. In the process of preparing a low softening point petroleum resin which comprises polymerising using a Friedel-Crafts catalyst
   a. a petroleum resin feed comprising $C_5$ olefins and $C_5$ diolefins, $C_6$ olefins and $C_6$ diolefins or a mixture of $C_5$ and $C_6$ olefins and diolefins, said feed being obtained from the cracking of a petroleum feedstock the improvement which comprises including therewith
   b. at least 0.5 wt.% based on the petroleum resin feed of a tertiary hydrocarbyl halide to obtain a resin of narrowed molecular weight distribution having tackifying properties for natural and synthetic rubbers.

2. A process according to claim 1 wherein at least 1 wt.% of the tertiary hydrocarbyl halide is used.

3. A process according to claim 2 wherein 1–4 wt.% of the tertiary hydrocarbyl halide is used.

4. A process according to claim 1 wherein the petroleum feedstock is cracked in the presence of steam.

5. A process according to claim 1 wherein the petroleum feedstock is cracked at a temperature of between 500° and 870° C.

6. A process according to claim 1 wherein the cracked feedstock is subjected to fractionation to remove $C_2$ and $C_4$ light ends and thermal soaking and distillation to remove cyclic conjugated diolefins.

7. A process according to claim 6 wherein the thermal soaking takes place at a temperature of 100° to 150° C.

8. A process according to claim 1 wherein the tertiary hydrocarbyl halide is a tertiary alkyl halide.

9. A process according to claim 1 wherein the hydrocarbyl chain in the tertiary hydrocarbyl halide contains 1 to 6 carbon atoms.

10. A process according to claim 4 wherein the tertiary hydrocarbyl halide is tertiary butyl chloride or tertiary butyl bromide.

11. A process according to claim 1 wherein the Friedel-Craftd catalyst is aluminium chloride, aluminium bromide or liquid aluminium chloride/hydrochloric acid/substituted aromatic complex.

12. A process according to claim 1 wherein the polymerization temperature is between 30° and 80° C.

13. A process according to claim 1 wherein the tertiary hydrocarbyl halide is combined with a branched-chain olefin and after polymerization the resin is stripped of unreacted hydrocarbons by flash distillation.

* * * * *